United States Patent
Squillace et al.

(10) Patent No.: US 6,526,408 B1
(45) Date of Patent: Feb. 25, 2003

(54) SYSTEM AND METHOD FOR IN-PROCESS DATA RECORD SUMMARIZATION AND EXCEPTION TESTING USING VIRTUAL DATA RECORDS HELD IN PROCESSOR MEMORY

(75) Inventors: Daniel Joseph Squillace, Cary, NC (US); Christopher Denis Weston, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 09/409,830

(22) Filed: Oct. 1, 1999

(51) Int. Cl.[7] .................................................. G06F 7/00
(52) U.S. Cl. ........................ 707/101; 707/10; 707/102; 711/1
(58) Field of Search ........................ 707/1–206; 711/1–6

(56) References Cited

U.S. PATENT DOCUMENTS 5,960,435 A * 9/1999 Rathmann et al. .......... 707/101

\* cited by examiner

*Primary Examiner*—Kim Vu
*Assistant Examiner*—Hung Pham
(74) *Attorney, Agent, or Firm*—Jones, Day, Reavis & Pogue

(57) ABSTRACT

A system and method for data record summarization and exception testing is provided in which a data viewer program forms a logical pipe for processing and presenting data records from an input data record source to summarization and exception testing programs. The data viewer program creates a virtual data record stored in the processor memory of the system, which is then presented directly to the summarization and exception testing programs for processing. By providing this logical pipe between the input data record source and the processing programs, the present invention eliminates the need for intermediate storage files on disk memory, and also greatly increases the processing efficiency of the system. The system also includes a summarization program that is capable of directly summarizing the virtual data records piped into it from the data viewer program, thus eliminating the need for a time-consuming sorting process prior to summarization.

13 Claims, 2 Drawing Sheets

SYSTEM AND METHOD FOR IN-PROCESS DATA RECORD SUMMARIZATION AND EXCEPTION TESTING USING VIRTUAL DATA RECORDS HELD IN PROCESSOR MEMORY

BACKGROUND OF THE INVENTION

1. Technical Field

The present invention is directed to the field of data summarization and exception testing systems and methods. More specifically, the invention relates to a system and method for performing data record summarization and exception testing that does not require intermediate working files stored on disk memory or a separate sorting file.

2. Description of the Related Art

Systems and methods for summarizing large collections of data records and for performing exception tests on these records are known in this field. FIG. 1, described in more detail below, sets forth the most common type of these data record summarization and exception testing systems. As seen in this figure, the prior art system creates at least two intermediate working files stored to disk memory during the summarization process. The first file is a detail file 28, which stores information in a particular format from all of the data records to be summarized. The detail file 28 is then sorted in order to put the information into a better format for summarization, and a separate sorted detail file 32 is then generated and also stored to disk memory. Finally, the system summarizes the information in the data records by processing the sorted detail file 32 using a summarization program. At this stage, an exception testing program may also operate on the sorted detail file 32, in order to create an output exception file.

This system, however, suffers from two primary disadvantages. First, it requires an excessive amount of disk memory to operate. For large management and analysis systems there may be tens of millions of data records to process. By storing these data records in the detail file and then storing them again in a much larger sorted detail file, this system and method limits its applicability to those computer systems that have access to massive disk memory storage resources. Second, this system is very inefficient. The amount of processing time required to create the detail file and then go through the sorting process prior to summarization or exception testing makes this process inherently inefficient.

Thus, there remains a need in this field for a data record summarization and exception testing system and method that does not require an excessive amount of disk storage, and which is more efficient than the presently known systems.

SUMMARY OF THE INVENTION

A system and method for data record summarization and exception testing is provided in which a data viewer program forms a logical pipe for processing and presenting data records from an input data record source to summarization and exception testing programs. The data viewer program creates a virtual data record stored in the processor memory of the system, which is then presented directly to the summarization and exception testing programs for processing. By providing this logical pipe between the input data record source and the processing programs, the present invention eliminates the need for intermediate storage files on disk memory, and also greatly increases the processing efficiency of the system. The system also includes a summarization program that is capable of directly summarizing the virtual data records piped into it from the data viewer program, thus eliminating the need for a time-consuming sorting process prior to summarization.

According to one aspect of the invention, a method of summarizing data records is provided, that includes the following steps: (1) providing an input data record source; (2) executing a data record summarization program having an input interface for receiving data records and an output interface for generating a summarized file; and (3) piping the data records from the input data record source directly into the data record summarization program using a data viewer program that creates a virtual data record in processor memory, which is then coupled to the input interface of the data record summarization program for processing.

According to another aspect of the invention, a single-pass method of in-process data record summarization is provided. The first step in this method is providing an input data record source. The second step of the method is executing a data record summarization program for summarizing certain data fields within the data records. And the third step of this method is executing a data viewer program for consecutively reading the data records from the input data record source and for piping the data records to the data record summarization program in a common format that is capable of being processed by this program.

Still another aspect of the invention provides a method of performing exception testing in a data record summarization process, comprising the steps of: providing a source of data records; executing a data viewer program that reads data records from the source of data records and stores those data records as virtual data record in processor memory for piping to a summarization process; and performing an exception test on each virtual data record in processor memory to determine if the data in the virtual data record meets an exception criteria, and if so, then writing that virtual data record to an exception file.

Yet another aspect of the invention is a method of data record summarization and exception testing using only processor memory as an intermediate data store, comprising the steps of: (A) providing a source of input data records; (B) executing a data record summarization program that attempts to read the data records from the source in order to summarize them; (C) when the data record summarization program attempts to read the data records, then executing a data viewer program that pipes the data records from the source of input data records to the summarization program via virtual data records stored in processor memory; (D) summarizing the virtual data records using the data record summarization program and generating a summarized file; and (E) performing exception testing on the virtual data records and generating an exception file that includes the virtual data records that meet the exception test.

Still another aspect of the invention is a network performance management system. This system includes a processor for executing the system, the processor having a memory; a source of data records, wherein the data records include data fields that describe the performance of a network; a summarization program having an input interface for receiving the data records and an output interface for generating a summarized file; and a data viewer program coupled between the source of data records and the summarization program for forming a logical pipe between the source and the summarization program by reading the data records from the source and storing those data records as virtual data records in the processor memory.

It should be noted that these are just some of the many aspects of the present invention. Other aspects not specified will become apparent upon reading the detailed description set forth below.

The present invention overcomes the disadvantages of presently known summarization and exception testing systems and methods and also provides many advantages, such as: (1) the invention does not require a tremendous amount of disk space to operate; (2) the invention does not require that intermediate working files are created and stored to disk memory; (3) the invention does not require a separate sort file; (4) the invention is more efficient than known systems and methods in this field; (5) the invention can operate on almost any computer because it is not constrained by disk memory requirements; and (6) the invention provides in-process exception testing on the data records.

These are just a few of the many advantages of the present invention, which is described in more detail below in terms of the preferred embodiments. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the general need noted above and provides many advantages, as will become apparent from the following description when read in conjunction with the accompanying drawings, wherein.

DETAILED DESCRIPTION OF THE DRAWINGS

Figure 1:
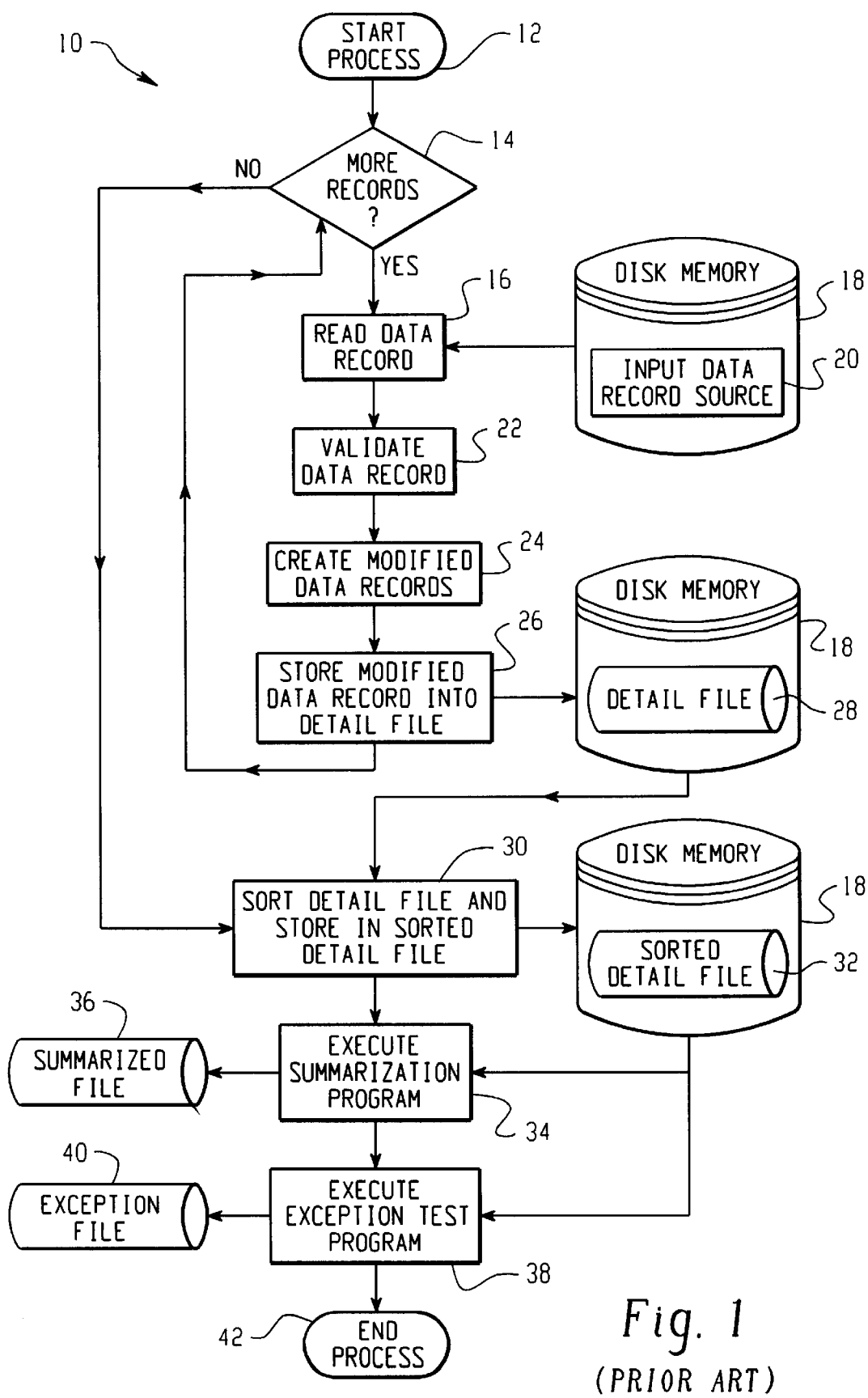
FIG. 1 is a flow chart diagram showing a prior art method of performing summarization and exception testing on an input data record source.

Turning now to the drawing figures, FIG. 1 sets forth a flow chart diagram showing a prior art method and system for performing summarization and exception testing on an input data record source 20. The prior art method begins at step 12. From here, the system 10 first determines whether there are data records to process 14. If there are more data records to process, then control passes to step 16, and a data record is read from the input data record source 20, which may be a flat file, an ASCII file, or a binary file, which is stored on Disk Memory 18, or tape memory (not shown). If there are no additional records to process for this particular data record source 20, then control of the prior art process passes to the sorting steps, discussed below.

After each data record from the input data record source 20 is read into the prior art system 10, the record is then validated at step 22, and then additional data fields may be added to the data record at step 24 in order to create a modified data record. (These steps are described in more detail below with respect to the present invention.) Having validated the input data record and created the modified data record, the prior art system 10 then stores the modified data record into a first intermediate data structure referred to as a detail file 28. The detail file 28 is structured using a common format that can be processed by the subsequent sorting, summarization and exception testing steps. This file 28 is stored to Disk Memory 18. Control of the method then passes back to step 14 in order to determine whether there are additional data records to process. Each subsequent data record is then read from the input data record source 20, validated and modified, and then added to the intermediate detail file 28 stored on Disk Memory 18.

Creating this detail file 28 on Disk Memory 18 is one of the primary disadvantages in the prior art method 10. For certain applications, such as network performance management systems, on-line transaction and analytical processors, etc., the size of the input data records source 20 can be enormous. For example, in a typical application there may be 10, 20 or 30 million data records stored in the input data record source 20. Therefore, in order to create the intermediate detail file 28, a prior art system would need a huge Disk Memory 18. Many systems simply do not have access to such a large Disk Memory 18, and thus cannot operate the prior art method.

Once the data records from the input data records source 20 have been processed and stored in the detail file 28, control of the prior art method passes to the sorting operations. At step 30, the detail file 28 is sorted and then stored in a second intermediate data structure referred to as a sorted detail file 32, which is also stored in Disk Memory 18. The sorting operation is performed in order to convert the modified data records within the detail file 28 into a summary sequence that is more readily processed by the summarization program 34. For example the sorting algorithm 30 may sort the records by time, date, type of transaction, transaction code, by user, etc., depending on the type of summarization procedure 34 that is to execute against the data records. This sorting process, although shown as one step 30 in FIG. 1, may actually require multiple passes through the data records in the detail file 28 in order to properly sort the information contained therein.

This sorting step 30 in the prior art method is disadvantageous for two reasons. First, the sorted detail file 32 that is output from the sorting step 30 is even larger than the detail file 28. In fact, the sorted detail file 28 can be 2 or 3 times larger than the detail file 28 from which it was created. This further exacerbates the problem with the prior art method in requiring a massive Disk Memory 18 to store the detail file 28 and the sorted detail file 32. Second, the sorting operation 30 requires a large amount of processing time, particular for very massive input data records sources 30, thus resulting in an inefficient process.

The sorted detail file 32 is provided as an input source to a summarization program at step 34 and an exception testing program at step 38. The summarization program 34 processes the data in the sorted detail file 32 based upon certain classification variables supplied as parameters to the program 34 and produces a summarized file 36. The exception testing program 38 also processes the data in the sorted detail file 32 using certain exception criteria provided to the program 38 and produces an exception file 40. The prior art method ends at 42.

Figure 2:
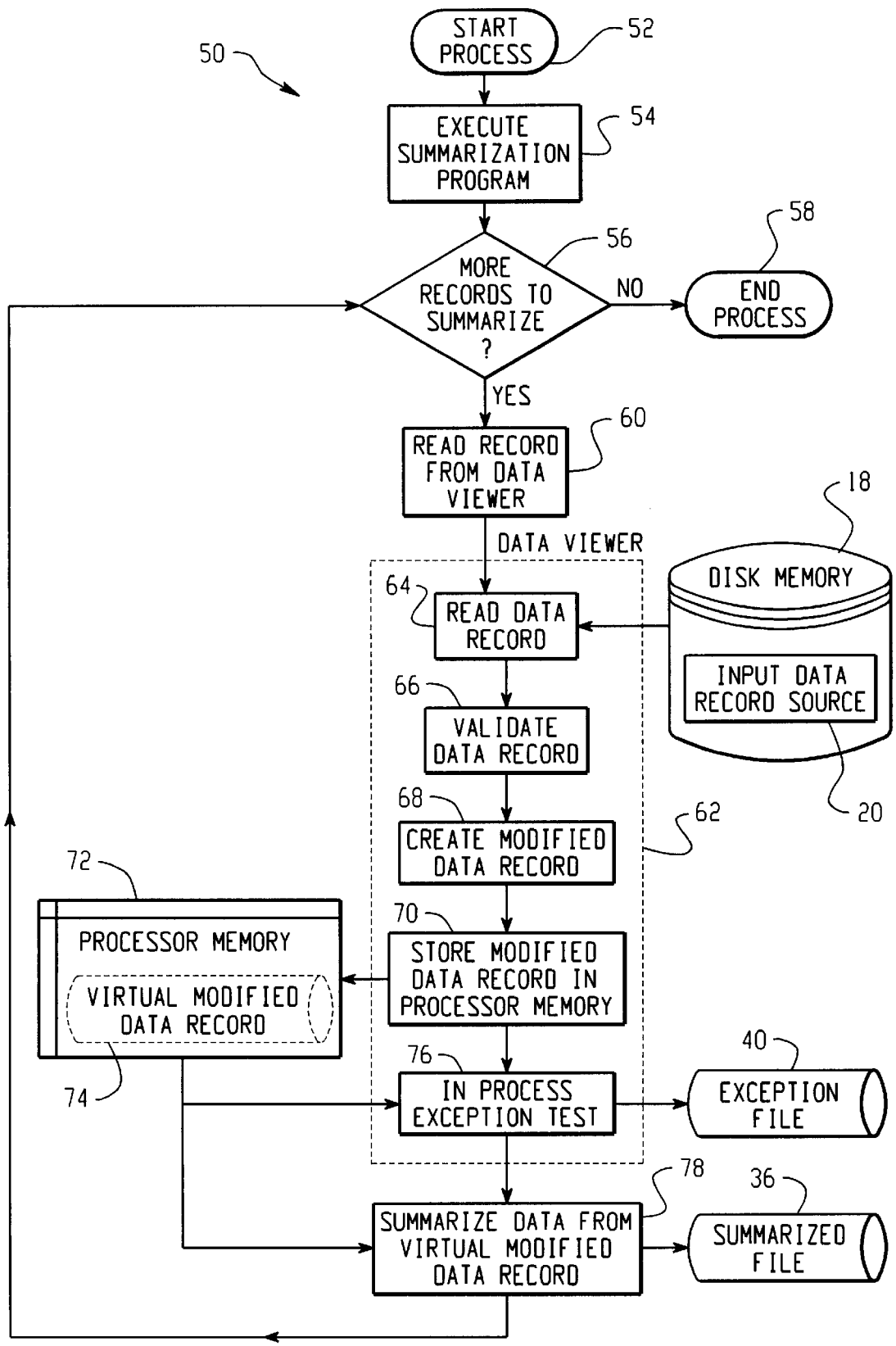
FIG. 2 is a flow chart diagram showing the preferred method steps and system elements of the present invention for performing in-process summarization and exception testing using virtual data records held in processor memory.

Turning now to the present invention, FIG. 2 is a flow chart diagram showing the preferred method and system elements 50 for performing in-process summarization and exception testing using virtual data records held in processor memory. Although the process and system described in this application can be used with many different types of computer software applications that summarize (or analyze) large amounts of data, the preferred implementation of the invention is within the context of a network performance management system that is collecting and storing data records related to the performance of a network. An example of such a program is IT Service Vision™, which is available from SAS Institute, Cary, N.C. (See, also, "www.sas.com/software/it_vision" for more information on this system.)

The process begins at 52. As distinguished from the prior art process 10 where the summarization program 34 is executed at the end of the method, in the present invention 50, a summarization program is executed as the first step 54 of the method. This summarization program 54 is similar to the summarization program 34 shown in FIG. 1 in the sense that it summarizes data records from an input source based on classification variables supplied as parameters to the program, but is different in the sense that it does not require a sorted detail file 32 as in the prior art. For example, such a summarization program is available as part of the Base SAS® program, which is available from SAS Institute, Cary, N.C.

Once the summarization program is executing, at step 56 it determines whether there are additional data records to summarize. If there are not more data records to summarize, then the method simply ends 58. If there are more data records to process, then control passes to step 60, where the next data record is read 60 into the summarization program through a "data viewer" process 62. The data viewer process 62 is a compiled program that executes against the input data records source 20. However, unlike the prior art method where the data records are processed and stored to Disk Memory 18, the data viewer process 62 operates like a logical "pipe" between the input data record source 20 and an input interface of the summarization program 54 in order to provide a stream of processed data records that are suitable for in-process summarization by the summarization program 54. This same viewer process 62 also provides for in-process exception testing. By providing this data viewer process between the input data record source and the summarization and exception testing programs, the present invention overcomes the disadvantages of the prior art because it does not require a large Disk Memory 18, and because it eliminates the need for a time-consuming sorting process.

The data viewer 62 reads the next data record at step 64 from the input data records source 20. This record is then validated at step 66. The validation step 66 examines certain data fields in the data record to determine if they are out of bounds. For example, one of the data fields may represent CPU time, and the validation step may then review this data field to determine whether the CPU time is a positive or a negative number. A negative number would reveal that something is wrong with this particular record, in which case it may be discarded from further processing. After validation, the data viewer 62 may optionally create a modified data record from the data record by adding certain data fields to the record and performing any required calculations to populate the added data field. For example, the data record may contain a field that reports CPU time for a particular transaction or event as a raw number of seconds, or milliseconds, but it may be desirable to summarize and report this field as a percentage. In this event, the data viewer 62 at step 68 would add a percentage CPU time field to the data record and calculate the corresponding percentage in order to populate the added data field. This is just one example of the type of additional data fields that could be added, in-process, to the data records prior to actual summarization and exception testing.

At step 70, the validated, potentially modified, data record is then stored as a virtual modified data record in the processor memory 70 of the system 50. If the record was not modified in step 68, then the method would store a virtual data record instead of a virtual modified data record. However, in either case the formatting of the data record as stored in the virtual processor memory 72 may be different than the original formatting of the data record as read from the input data record source 20 in order to facilitate the interface between the data view program and the summarization and exception testing programs. Note that in the present invention, the data records are not stored into a detail file 28 on Disk Memory 18 as in the prior art system. Instead, the individual data records are simply held in the processor memory 72 as virtual data records 74 for subsequent piping to the in-process exception test program 76 and the summarization program 54. It is by providing this logical pipe that the present invention overcomes many of the shortcomings in the prior art summarization and exception processing method.

After storing the modified data record into the virtual memory space 72 of the processor, the data viewer 62 then performs the in-process exception testing on the virtual record. The exception testing is done in order to determine whether there are certain anomalous data fields within a particular record. For example, the data records may represent on-line transactions in which a typical transaction should take no more than 2 seconds of CPU time to process. An exception testing criterion may be supplied to the in-process exception test 76 to flag any data record where the CPU time field is greater than 4 seconds, for example, which may indicate that a problem has occurred and that it would be useful to examine the entire contents of the particular data record for this transaction. For those records that meet the exception criteria, the data viewer copies these data records to the exception file 40 for later analysis. By operating the exception test program in an in-process manner via the data viewer 62, the present invention provides for a more efficient exception testing scheme in that the exception testing program does not need to operate on the much larger sorted detail file 32, as in the prior art method, thus reducing the processing time required to execute the exception test.

After exception testing, or in parallel to this process, the virtual modified data record 74 stored in the system's processor memory 72 is supplied to the summarization program 54 through the logical pipe provided by the data viewer 62. At step 78, the summarization program process the virtual modified data record 74 based on classification variables supplied as parameters to the program. This summarization program, however, is different than the summarization program shown in FIG. 1 in that it does not require a sorted detail file as an input source. Instead, this summarization program operates directly on the virtual data records held in processor memory by building an array of in-memory buckets for each of the classification variables. In this manner, the program is able to sort and summarize the data in an in-process manner that does not require a separate sort file stored on Disk Memory 18, thus eliminating the need for a large disk resource as is required in the prior art method shown in FIG. 1. After processing the individual virtual data records, control of the process returns to step 56 so that more data records can be processed in the same manner. When all of the data records have been summarized, the process ends 58. As the records are being summarized in step 78, the process builds a summarized file 36, which includes the summary data from the in-memory buckets.

The preferred embodiments described with reference to the drawing figures are presented only to demonstrate an example of the invention. Other elements, steps, methods and techniques that are insubstantially different from those described herein are also within the scope of the invention.

What is claimed:

1. A method of summarizing data records, comprising the steps of:

providing an input data record source;

executing a data record summarization program having an input interface for receiving data records and an output interface for generating a summarized file; and piping the data records from the input data record source directly into the data record summarization program using a data viewer program that creates a virtual data record in processor memory, which is then coupled to the input interface of the data record summarization program for processing, performing an in-process exception test on the virtual data record stored in processor memory; and if the virtual data record meets the exception test, then writing the virtual data record to an exception file and providing the virtual data record so that the virtual data record may be made available to be summarized by the summarization program;

performing an in-process error test on the virtual data record stored in processor memory; and if the virtual data record meets the error test, then precluding the virtual data record from being summarized by the summarization program, said virtual data record being created before the virtual data record is to be summarized by the summarization program.

2. The method of claim 1, wherein the summarization program summarizes certain data fields within the data records based on classification variables provided to the summarization program.

3. The method of claim 1, wherein the piping step further includes the steps of:

reading a data record from the input data record source;

validating the data record; and storing the validated data record as a virtual data record in processor memory.

4. The method of claim 3, wherein the piping step further includes the step of creating a modified data record from the data record by adding data fields to the data record prior to storage in processor memory.

5. The method of claim 1, wherein said exception test on the virtual data record being performed to test for at least one preselected anomalous condition.

6. The method of claim 1, further comprising the steps of:

summarizing the data in the virtual data record using an array of in-memory buckets, wherein each in-memory bucket is associated with a particular classification variable that is to be summarized; and writing the contents of the in-memory buckets to a summarized file.

7. The method of claim 1, wherein the summarization program and the data viewer program are part of a network performance management system.

8. The method of claim 7, wherein the data records store information related to the performance of a network.

9. The method of claim 1, wherein the summarization program and the data viewer program are part of a transaction processing system.

10. A single-pass method of in-process data record summarization, comprising the steps of:

providing an input data record source;

executing a data record summarization program for summarizing certain data fields within the data records;

executing a data viewer program for consecutively reading the data records from the input data record source and for piping the data records to the data record summarization program in a common format that is capable of being processed by this program, and performing through the data viewer program an in-process exception test on the data records; and if a data record meets the exception test, then providing the data record to an exception storage location and providing the data record so that the data record may be made available to be summarized by the summarization program;

performing through the data viewer program an in-process error test on the data records; and if a data record meets the error test, then precluding the data record from being summarized by the summarization program, said data records being created as virtual data records in processor memory before the data records are to be summarized by the summarization program.

11. A method of performing exception testing in a data record summarization process, comprising the steps of:

providing a source of data records;

executing a data viewer program that reads data records from the source of data records and stores those data records as virtual data record in processor memory for piping to a summarization process;

performing an exception test on each virtual data record in processor memory to determine if the data in the virtual data record meets an exception criteria, and if so, then writing that virtual data record to an exception file, said virtual data record that is written to the exception file being made available to be summarized by the summarization process, said exception test on each virtual data record being performed to test for at least one preselected anomalous condition; and performing an error test on each virtual data record stored in processor memory, and if the virtual data record meets the error test, then precluding the virtual data record from being summarized by the summarization process.

12. A method of data record summarization and exception testing using only processor memory as an intermediate data store, comprising the steps of:

providing a source of input data records;

executing a data record summarization program that attempts to read the data records from the source in order to summarize them;

when the data record summarization program attempts to read the data records, then executing a data viewer program that pipes the data records from the source of input data records to the summarization program via virtual data records stored in processor memory;

summarizing the virtual data records using the data record summarization program and generating a summarized file, said virtual data records being created before the virtual data record is to be summarized by the summarization program, and performing exception testing on the virtual data records and generating an exception file that includes the virtual data records that meet the exception test, said virtual data records that are included in the exception file being made available to be summarized by the summarization process, said exception testing on the virtual data records being performed to test for at least one preselected anomalous condition, and performing an error test on the virtual data records, and if a virtual data record meets the error test, then precluding the virtual data record from being summarized by the summarization program.

13. An in-process network performance management method, comprising the steps of:

executing a data record summarization program having an input interface for receiving input data records indicative of performance of a network;

during operation of the network, piping an input data record from an input data record source directly into the data record summarization program using a data viewer program that creates a virtual data record in processor memory, which is then coupled to the input interface of the data record summarization program for processing, said virtual data record being created before the virtual data record is to be summarized by the summarization program;

during operation of the network, performing the following steps:

(a) performing an in-process exception test on the virtual data record stored in processor memory; and if the virtual data record meets the exception test, then writing the virtual data record to an exception file and providing the virtual data record so that the virtual data record may be made available to be summarized by the summarization program, (b) performing an in-process error test on the virtual data record stored in processor memory; and if the virtual data record meets the error test, then precluding the virtual data record from being summarized by the summarization program, and (c) generating and outputting network performance summary data using the created virtual data record in the processor memory;

determining whether another data record from the input data record source exists and if another data record exists, then executing steps a, b and c with respect to the another data record.

* * * * *